Oct. 17, 1944. E. E. CHALBERG 2,360,759
AIRCRAFT LANDING GEAR
Filed Oct. 5, 1942 5 Sheets-Sheet 1

Inventor

Edward Emil Chalberg

By Clarence A. O'Brien
and Harvey B. Jacobson
Attorneys

Oct. 17, 1944. E. E. CHALBERG 2,360,759
AIRCRAFT LANDING GEAR
Filed Oct. 5, 1942 5 Sheets-Sheet 4

Inventor
Edward Emil Chalberg

By Clarence A. O'Brien
and Harvey B. Jacobson
Attorneys

Patented Oct. 17, 1944

2,360,759

UNITED STATES PATENT OFFICE 2,360,759

AIRCRAFT LANDING GEAR

Edward Emil Chalberg, San Diego, Calif.

Application October 5, 1942, Serial No. 460,879

3 Claims. (Cl. 244—102)

This invention relates to new and useful improvements in landing gear for aircraft.

The principal object of the present invention is to provide a landing gear which will be self-locking in both landing and retracted positions.

Another important object of the invention is to provide a landing gear which will be constructed on the safety basis of having dual wheels and individual retracting mechanism for each.

Another important object of the invention is to provide landing gear for aircraft which will be positive acting and fool-proof in operation.

Other objects and advantages of the invention will become apparent to the reader of the following description.

In the drawings:

Figure 2 is a fragmentary sectional and elevational view showing the dual type landing gear in retracted position.

Figure 3 is an elevational view of one of the wheel units.

Figure 1:
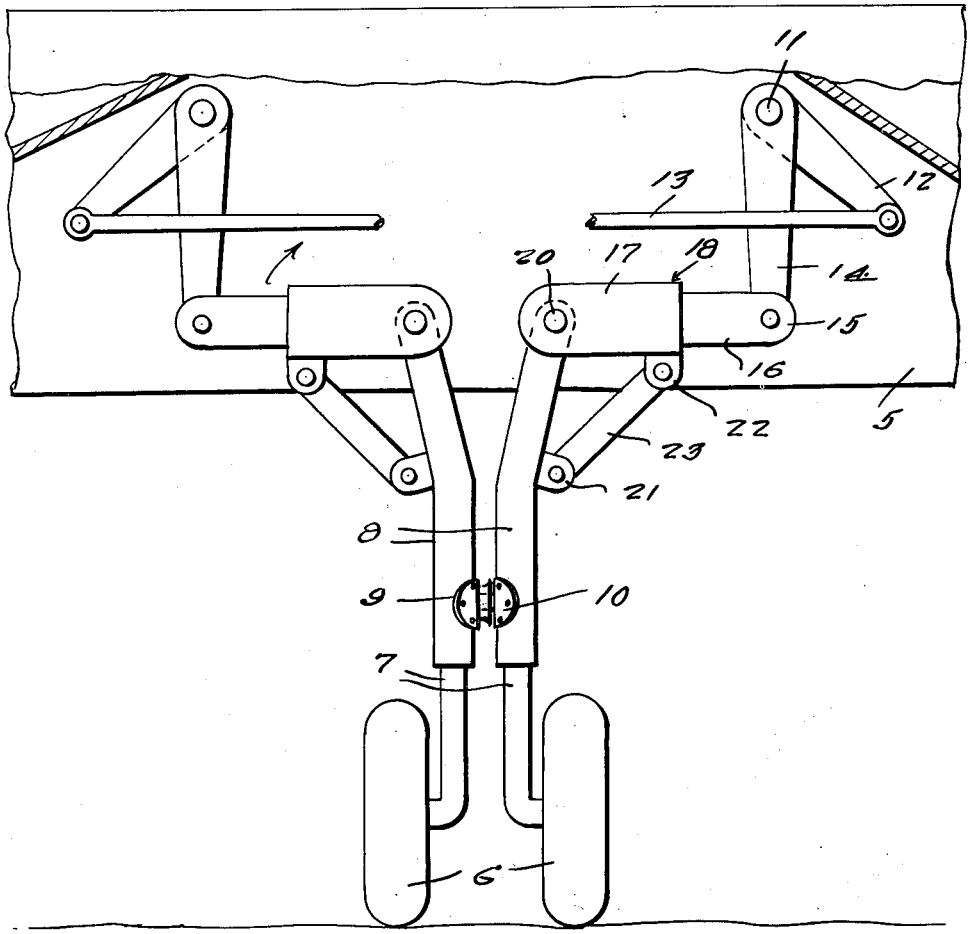
Figure 1 represents an elevational view showing the dual type landing gear in landing position.

Referring to Figure 1, and eventually to the other figures, wherein like numerals designate like parts, it can be seen that numeral 5 denotes a pocket into which the particular wheel assembly of the aircraft landing gear can be retracted.

The present invention contemplates constructing each landing wheel assembly in a dual fashion, as shown in Figure 1. In place of the single landing wheel, the present invention contemplates two landing wheels 6, 6, each having a neck 7 extending upwardly into a leg 8. These two legs are in close spaced relation when the landing gear is in landing position, one leg carrying a socket member 9, while the other carries a plug member 10, to the end that the legs are held in proper upright position and cannot get offset.

As the operating means for these legs is the same, a description of one will suffice for both.

In further carrying out the present invention, for each leg 8, a shaft 11 is provided in the pocket 5 and has an arm 12 to which an operating rod 13 is connected.

A second arm 14 depends from the shaft 11 and pivotally connects to ears 15 on a barrel 16 which telescopes a second barrel 17 of a yieldable joint generally referred to by numeral 18. The barrel 17 has ears 19 which overlap the upper end of the corresponding leg 8 and a pin 20 serves to pivotally connect these parts. Further, the leg 8 has an ear 21, and the barrel 17 has an ear 22, these ears being connected by a link member 23.

Figure 4:
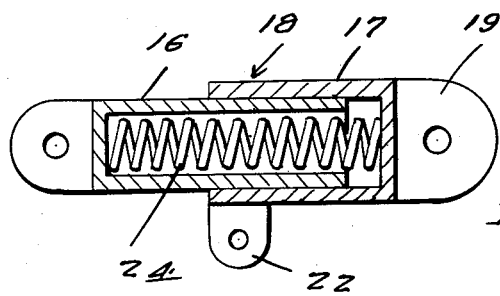
Figure 4 is a sectional view through one of the yieldable joints.

As can be seen in Figure 4, a coiled compression spring 24 is provided in the yieldable joint 18 so as to normally maintain the barrels 16, 17 extended.

It can now be seen that when the rods 13 in Figure 1 are pulled toward each other, the arm 14 will be moved in a manner that will cause the joints 18 to break inwardly in the direction of the arrows. When these joints have broken past dead center, the wheels and legs are being swung upwardly and obviously as the joints 18 pass dead center, the spring 24 therein will assist in serving to pass the joints beyond dead center, throwing the legs and wheels upwardly in opposite directions into the pocket 5 where they will remain against accidental displacement due to the action of the spring 24 in the joints 18 holding the joints and arm 14 in off centered position.

Figure 5:
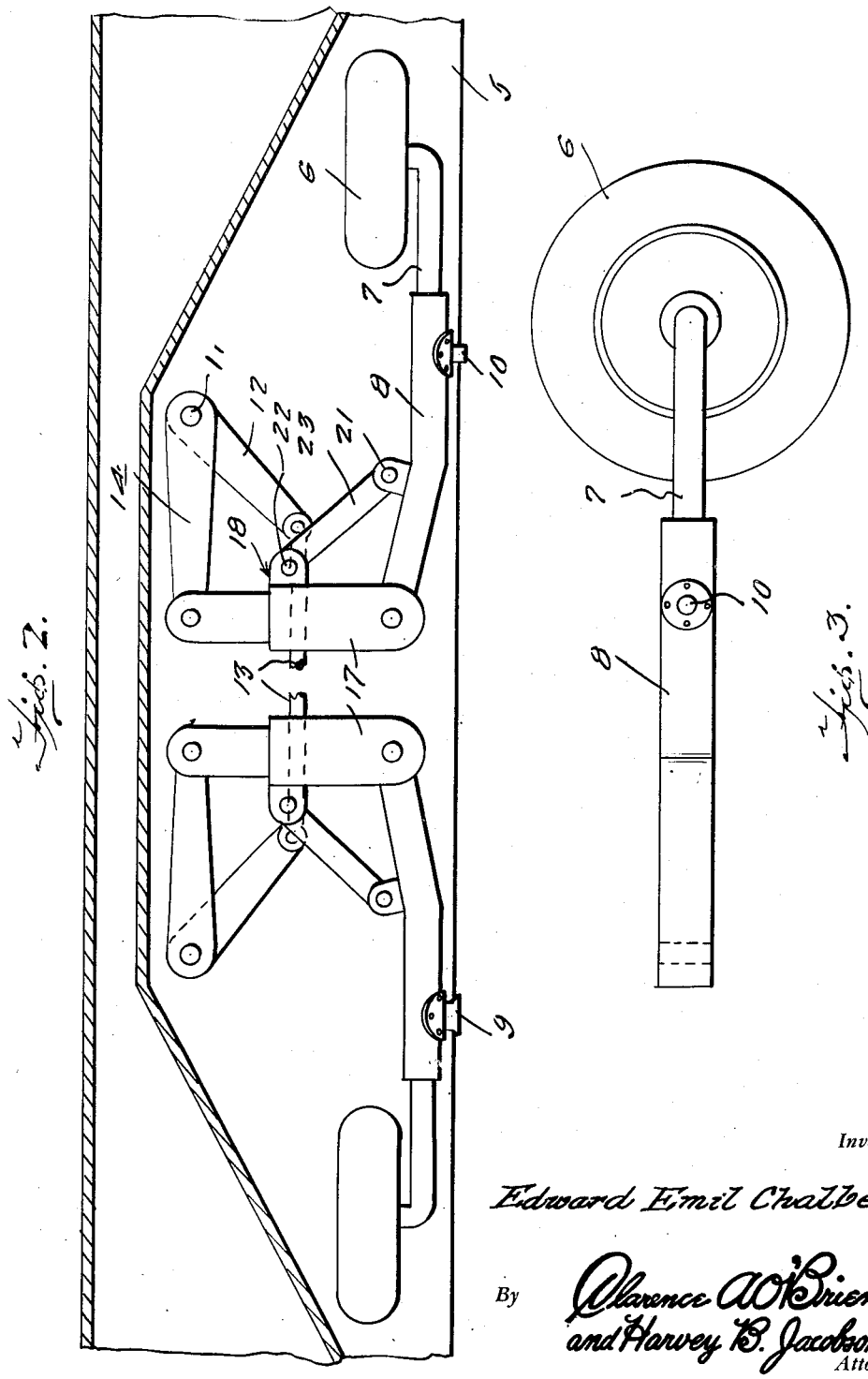
Figure 5 is a fragmentary side elevational view showing the improved retracting and extending mechanism used in conjunction with the conventional landing wheel.
Figure 6:
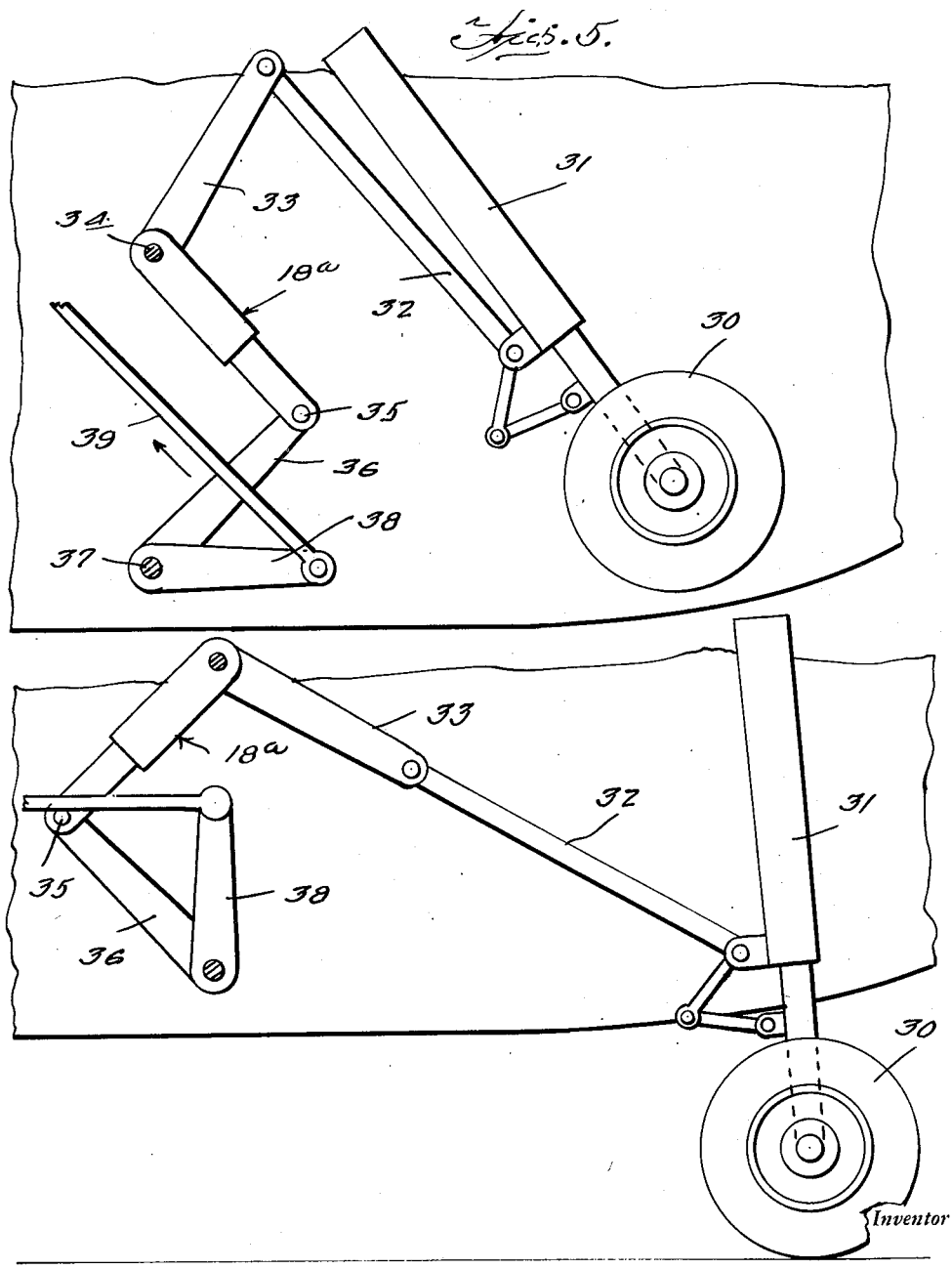
Figure 6 is a side elevational view of the structure shown in Figure 5, showing the landing wheel in extended position.

A modified form of the invention is shown in Figures 5 and 6 wherein a single conventional wheel 30 is mounted on a leg 31 and a link member 32 extends from this leg 31 to an arm 33 on a shaft 34. A yieldable joint 18a corresponding to the joint 18 is connected to the shaft 34 at one of its ends. The other end of the joint 18a is pivotally connected, as at 35, to an arm 36 which extends from a shaft 37. The shaft 37 has an arm 38 which is pivotally connected to one end of a drive rod 39.

It can now be seen that when the rod 39 is pulled in the direction of the arrows in Figure 5, the joint 18a will be contracted, will pass dead center and then spring to an off centered position as the wheel 30 is brought down to landing position.

Figure 7:
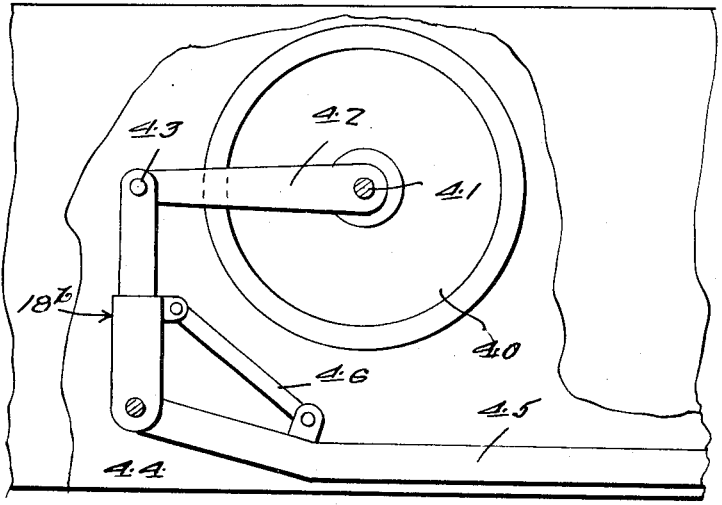
Figure 7 is a fragmentary side elevational view showing a somewhat modified form of drive means for the mechanism.

Figure 7 shows another form of the invention, numeral 40 denoting a gear, pulley or some other drive element for a shaft 41, which shaft has an arm 42 pivotally connected, as at 43, to one cylinder of the yieldable joint 18b, corresponding in construction to the joint 18. The other cylinder of the joint is pivotally connected, as at 44, to the upper end of a landing wheel leg 45, this leg being connected by a link member 46 to the adjacent cylinder of the joint 18b.

Obviously, the form of the invention in Figure 7 is operated by rotation of the gear, pulley, or the like, 40, which compresses the joint 18b and throws it off center where it is held by the internal spring 24 maintaining the wheel leg 45 in lowered landing position.

Figure 8:
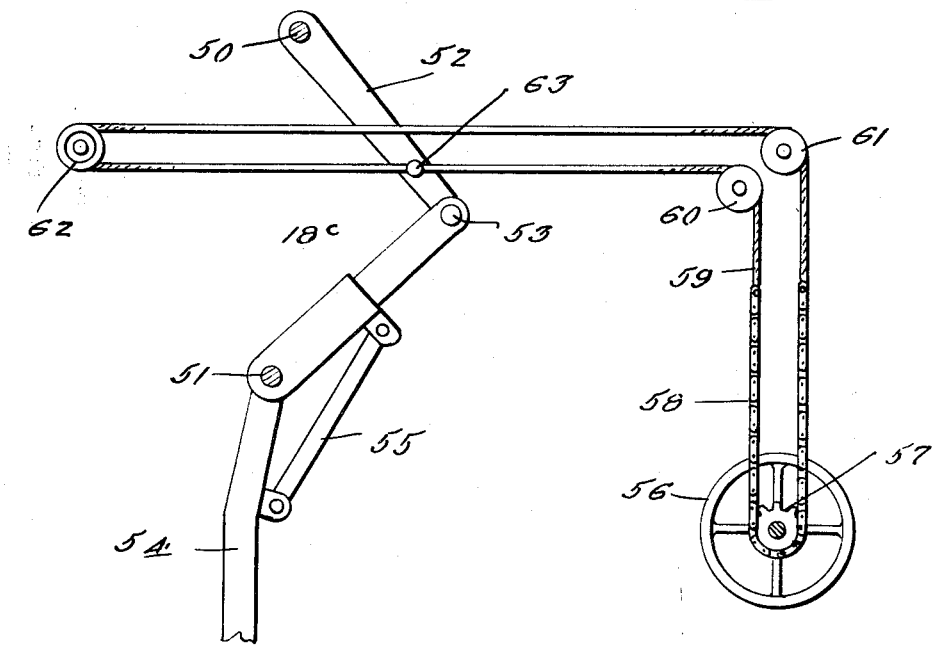
Figure 8 is a fragmentary side elevational view showing the hand operated drive for the mechanism.

Another form of the invention is shown in Figure 8, wherein a pair of shafts 50, 51 are provided, the shaft 50 having an arm 52, while the shaft 51 at one end has a yieldable joint 18c connected thereto, the remaining end of the joint 18c being pivotally connected, as at 53, to the remaining end of the arm 52. Numeral 54 denotes the upper end of a wheel leg which is rigidly connected to the shaft 51 and a link connection 55 is provided between the upper portion of the leg 54 and the adjacent section of the joint 18c.

The operating mechanism for this consists of a hand wheel 56 driving a sprocket wheel 57 over which a sprocket chain 58 is trained. The ends of this sprocket chain 58 are connected to the ends of a length of rope or the like 59 which in turn is trained over a pair of pulleys 60 and 61 and over a distal pulley 62. One flight of this rope or the line 59 is anchored, as at 63, to the arm 52. Obviously, rotation of the wheel 56 will impart motion to the arm 52 in throwing the joint 18c to one position or the other.

Figure 9:
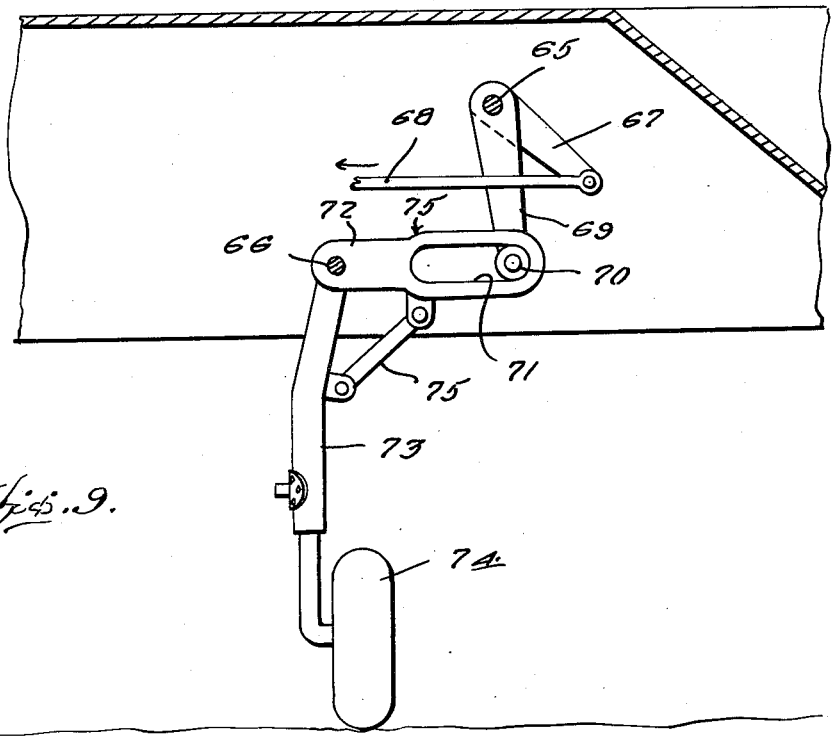
Figure 9 is a fragmentary elevational view showing a pin and slot joint replacing the type of joint shown in Figure 4.
Figure 10:
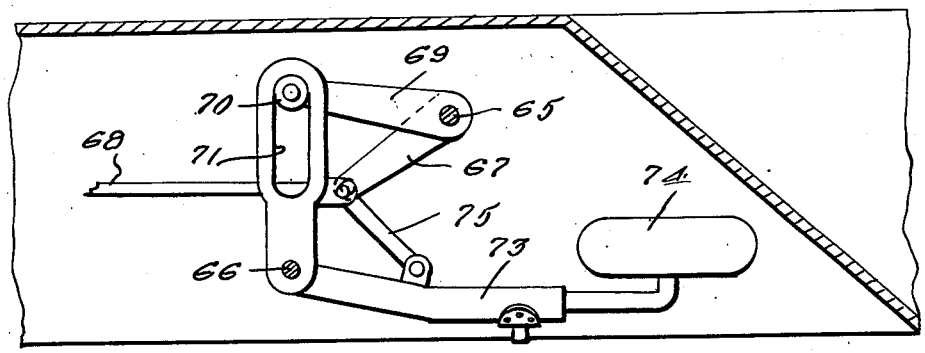
Figure 10 is a fragmentary elevational view showing the mechanism of Figure 9 in retracted position.

A further form of the invention is shown in Figures 9 and 10, and in this form of the invention a pair of shafts 65, 66 are provided, the shaft 65 having an arm 67 to which is connected an operating rod 68. The shaft 65 has a second arm 69 provided with a roller 70 operating in a slot 71 of an arm 72 secured to the shaft 66. Depending from the shaft 66 is a landing wheel leg 73 having a leg 74 at its lower end. The link brace 75 is provided between the leg 73 and the slotted arm 72. Obviously, operation of the rod 68 by being moved to the left in Figure 9 will result in throwing the joint generally referred to by numeral 76 upwardly to the position shown in Figure 10, while at the same time retracting the wheel. This form of the invention is quite similar to that of Figure 1, excepting that the yieldable joint 18 is replaced.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. An aircraft landing gear comprising a wheel assembly consisting of a pair of closely spaced wheels, a leg for each wheel adapted for raising and lowering movement toward and away from each other, interengaging means carried by the legs and engageable when the legs are lowered to retain the wheels in axial alinement, and means for elevating and lowering the legs simultaneously, said means consisting of a shaft for each leg, an arm on each shaft, and a yieldable joint between each arm and its corresponding leg.

2. An aircraft landing gear comprising a wheel assembly consisting of a pair of closely spaced wheels, a leg for each wheel adapted for raising and lowering movement toward and away from each other, interengaging means carried by the legs and engageable when the legs are lowered to retain the wheels in axial alinement, and means for elevating and lowering the legs simultaneously, said means consisting of a shaft for each leg, an arm on each shaft, and a yieldable joint between each arm and its corresponding leg, each of the joints comprising a pair of telescopic elements and a compression spring interposed between the same for maintaining the same in extended position.

3. An aircraft landing gear comprising a wheel assembly consisting of a pair of closely spaced wheels, a leg for each wheel adapted for raising and lowering movement toward and away from each other, interengaging means carried by the legs and engageable when the legs are lowered to retain the wheels in axial alinement, and means for elevating and lowering the legs simultaneously, said means consisting of a shaft for each leg, an arm on each shaft, and a yieldable joint between each arm and its corresponding leg, said joint comprising an arm on the leg having a slot therein and a roller on the first-mentioned arm riding in the slot.

EDWARD EMIL CHALBERG.